(12) United States Patent
De Carné-Carnavalet et al.

(10) Patent No.: US 12,281,613 B2
(45) Date of Patent: Apr. 22, 2025

(54) TURBOFAN ENGINE WITH AT LEAST ONE GUIDE VANE INCLUDING A VARIABLE-GEOMETRY ZONE

(71) Applicant: SAFRAN AIRCRAFT ENGINES, Paris (FR)

(72) Inventors: Vincent Marie Jacques Rémi De Carné-Carnavalet, Moissy-Cramayel (FR); Guillaume Olivier Vartan Martin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/248,211

(22) PCT Filed: Oct. 18, 2021

(86) PCT No.: PCT/FR2021/051808
§ 371 (c)(1),
(2) Date: Apr. 6, 2023

(87) PCT Pub. No.: WO2022/084611
PCT Pub. Date: Apr. 28, 2022

(65) Prior Publication Data
US 2023/0374940 A1    Nov. 23, 2023

(30) Foreign Application Priority Data
Oct. 22, 2020   (FR) ......................................... 2010841

(51) Int. Cl.
*F02C 7/042*    (2006.01)
*F02C 7/18*     (2006.01)
*F02K 3/06*     (2006.01)

(52) U.S. Cl.
CPC ................ *F02C 7/042* (2013.01); *F02C 7/18* (2013.01); *F02K 3/06* (2013.01); *F05D 2220/323* (2013.01); *F05D 2250/90* (2013.01)

(58) Field of Classification Search
CPC .... F02C 7/042; F02C 7/18; F02C 6/06; F02C 6/08; F02K 3/06; F05D 2220/323; F05D 2250/90
See application file for complete search history.

(56) References Cited

U.S. PATENT DOCUMENTS 3,237,918 A * 3/1966 Le Bell ................. F01D 17/162
                                                415/161
5,203,163 A * 4/1993 Parsons ..................... F02C 6/08
                                                 60/785

(Continued)

FOREIGN PATENT DOCUMENTS

EP    2 022 949 A2    2/2009
EP    2 267 273 A2    12/2010

OTHER PUBLICATIONS

International Search Report mailed Jan. 20, 2022, issued in corresponding International Application No. PCT/FR2021/051808, filed Oct. 18, 2021, 5 pages.

(Continued)

*Primary Examiner* — Steven M Sutherland
(74) *Attorney, Agent, or Firm* — CHRISTENSEN O'CONNOR JOHNSON KINDNESS PLLC

(57) ABSTRACT

A turbojet engine, having a primary duct and a secondary duct surrounding the primary duct, a row of guide vanes extending in the secondary duct downstream of a fan, at least one conduit extending in the secondary duct downstream of the guide vanes and housed in a profiled casing, and at least one air sampling scoop located in the region of the casing and equipped with a control valve. Where at least one guide (Continued)

vane located in the vicinity of the casing has a variable geometry zone, the geometry of which can be adjusted during operation.

9 Claims, 3 Drawing Sheets

(56) References Cited

U.S. PATENT DOCUMENTS

| | | | | |
|---|---|---|---|---|
| 7,810,312 B2* | 10/2010 | Stretton | ............... | F02K 3/06 |
| | | | | 60/785 |
| 2009/0097967 A1* | 4/2009 | Smith | ............... | F04D 29/563 |
| | | | | 415/1 |
| 2010/0329878 A1* | 12/2010 | Bottome | ............ | F01D 9/041 |
| | | | | 416/223 R |
| 2015/0330309 A1 | 11/2015 | Bagnall et al. | | |

OTHER PUBLICATIONS

Written Opinion mailed Jan. 20, 2022, issued in corresponding International Application No. PCT/FR2021/051808, filed Oct. 18, 2021, 6 pages.

\* cited by examiner

TURBOFAN ENGINE WITH AT LEAST ONE GUIDE VANE INCLUDING A VARIABLE-GEOMETRY ZONE

CROSS-REFERENCE TO RELATED APPLICATIONS

This application is a National Stage of International Application No. PCT/FR2021/051808, filed Oct. 18, 2021, which claims priority to French Patent Application No. 2010841, filed Oct. 22, 2020, the entire disclosures of which are hereby incorporated by reference in their entirety for all purposes.

TECHNICAL FIELD OF THE INVENTION

The invention relates to a turbojet engine, in particular intended to equip an aircraft.

PRIOR ART

FIG. 1 illustrates a turbojet engine 1 of the prior art, intended to equip an aircraft, in particular an airplane. The turbojet engine 1 extends according to an axis X and includes, from upstream to downstream in the direction of gas circulation, a fan 2, a low-pressure compressor 3, a high-pressure compressor 4, a combustion chamber 5, a high-pressure turbine 6 and a low-pressure turbine 7. The low- and high-pressure compressors 3, 4, the combustion chamber 5 and the high- and low-pressure turbines 6, 7 are located in a so-called primary duct 8.

A so-called secondary duct 9 extending around the primary duct 8, downstream of the fan 2. An annular row of guide vanes 10 is located at the secondary duct 9, these guide vanes 10 forming an outlet guide vane or O.G.V. (Outlet Guide Vane). The guide vanes 10 extending radially between a radially outer shroud 11 and a casing 12 surrounding the low-pressure compressor 3.

These guide vanes 10 are intended to straighten the air flow circulating throughout the secondary duct 9. They may also ensure a structural function.

Moreover, in a turbojet engine, it is necessary to make pieces of equipment pass throughout the secondary stream, such as conduits, pipes, a power transmission shaft or a pylon connecting the turbojet engine to the aircraft. These pieces of equipment cross the secondary duct downstream of the guide vanes and, in order to meet aerodynamic constraints, these pieces of equipment are generally streamlined in a profiled casing. Such a casing is called bifurcation, when this casing extends up to the downstream end of the secondary duct, or arm, in the opposite case.

Air samples can be performed in the secondary duct, in which cold air circulates. These samples are intended to ensure cooling of devices of the aircraft (cooling of the air intended to get into the cabin, cooling of the air derived from the high-pressure compressor and intended to the aircraft, . . . ), or of devices of the turbojet engine (device for cooling and managing the clearances of the low-pressure turbine, . . . ). In order to perform such samples, the secondary duct may include scoops. These scoops can either be flush, i.e. consist of simple openings in the surfaces delimiting the secondary duct, or dynamic, i.e. extending at least partially in the secondary duct. In all cases, these scoops are equipped with valves which allow regulating or cutting off the air flow intended to the corresponding device of the turbojet engine.

These scoops are sources of pressure drops, creating an increase in the fuel consumption of the turbojet engine. Moreover, these scoops may be the source of potential pressure rises from the cold duct up to the fan, causing an aeroelastic excitation, acoustic disturbances and a reduction in the average efficiency of the fan as well as a reduction in the surge margin. These scoops may also be the source of additional acoustic disturbances by resonance of the cavity of the scoop, in particular when the corresponding valve is closed. Finally, the multiplication of scoops and associated pipes increases the difficulty of integration as well as the number of parts to be manufactured and mounted within the turbojet engine.

The documents EP 2 267 273 and US 2015/0330309 describe turbojet engines.

DISCLOSURE OF THE INVENTION

The invention aims to overcome these drawbacks in a simple, reliable and inexpensive manner.

To this end, the invention relates to a turbojet engine including a primary duct and a secondary duct surrounding the primary duct, a row of guide vanes extending in the secondary duct, downstream of a fan, at least one conduit extending in the secondary duct downstream of the guide vanes and housed in a profiled casing, at least one air sampling scoop located at the casing and equipped with a regulation valve, characterized in that at least one guide vane located proximate to the casing includes a variable-geometry zone and whose geometry can be adjusted during operation.

Such a feature allows modifying the shape, or the camber, of the considered guide vane and, thus, regulating the flow rate and controlling the nature of the flow at the scoop. This allows adapting better to the geometry of the scoop and to the air flow crossing the valve, so as to limit noises and vibrations during operation and improve the efficiency of the turbojet engine. The adjustment can be controlled using an actuator, such as a motor or a cylinder.

For example, a guide vane located proximate to the casing is a guide vane located circumferentially in an angular range comprised between −40° and +40° with respect to the upstream end of the casing.

The variable-geometry guide vane may include at least one pivotable zone whose pivot angle can be controlled.

The pivotable zone may be a zone downstream of said guide vane.

The casing may include an upstream portion forming, at least partially, one of the guide vanes. Such a structure allows further improving the performances of the turbojet engine.

The scoop may open out at a surface of the casing, at one opening, said opening being located, at least partially, axially opposite the guide vanes.

The scoop may open out at a surface of the casing, at one opening, said opening being located axially downstream of the guide vanes.

The scoop may open out at the upstream end of the casing.

The scoop may open out at an intrados surface or at an extrados surface of the casing.

The scoop may include an air circulation channel, said scoop including at least one fin located in said air circulation channel.

The presence of the fin allows improving guidance of the air flow throughout the scoop. The turbojet engine may include one or more scoops, for the same casing, for example a scoop opening at an intrados surface and a scoop opening at an extrados surface of the casing.

Said guide vane may be located at a distance from the casing. In other words, said guide vane including at least one variable-geometry zone is remote from the casing along the axis of the turbine engine.

The invention may also include an aircraft including a turbojet engine of the aforementioned type.

DETAILED DESCRIPTION OF THE INVENTION

Figure 2:
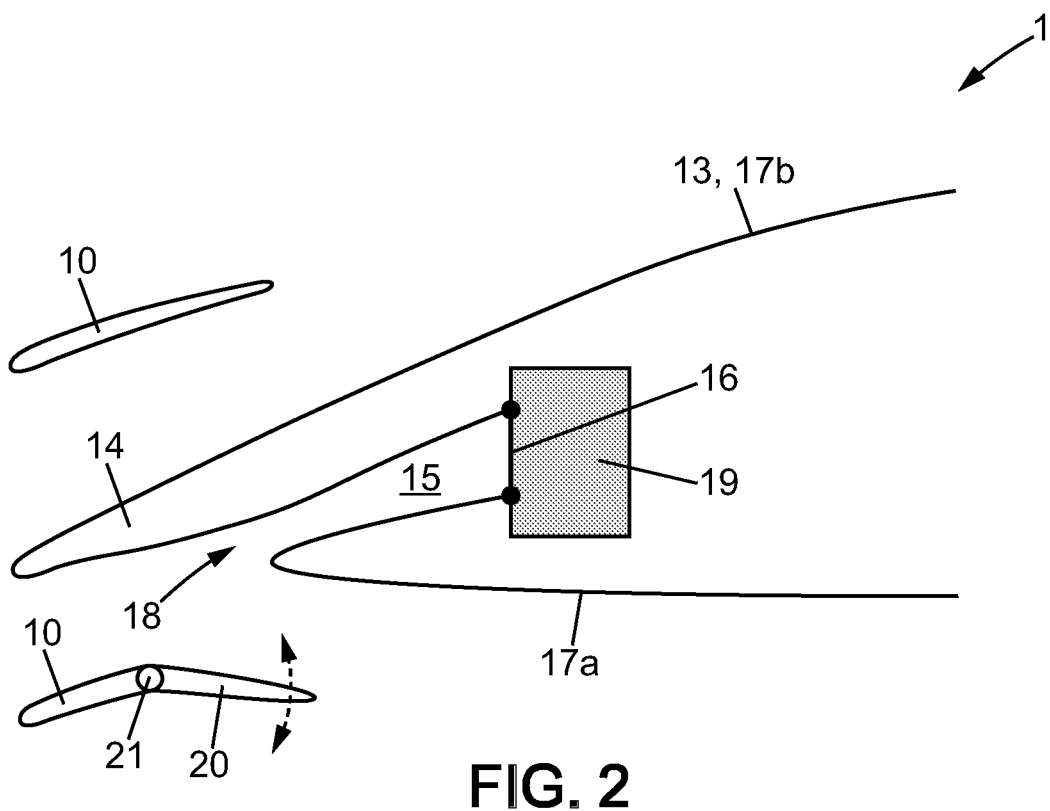
FIG. 2 is a schematic view of a portion of the secondary duct of a turbojet engine according to a first embodiment of the invention.
Figure 3:
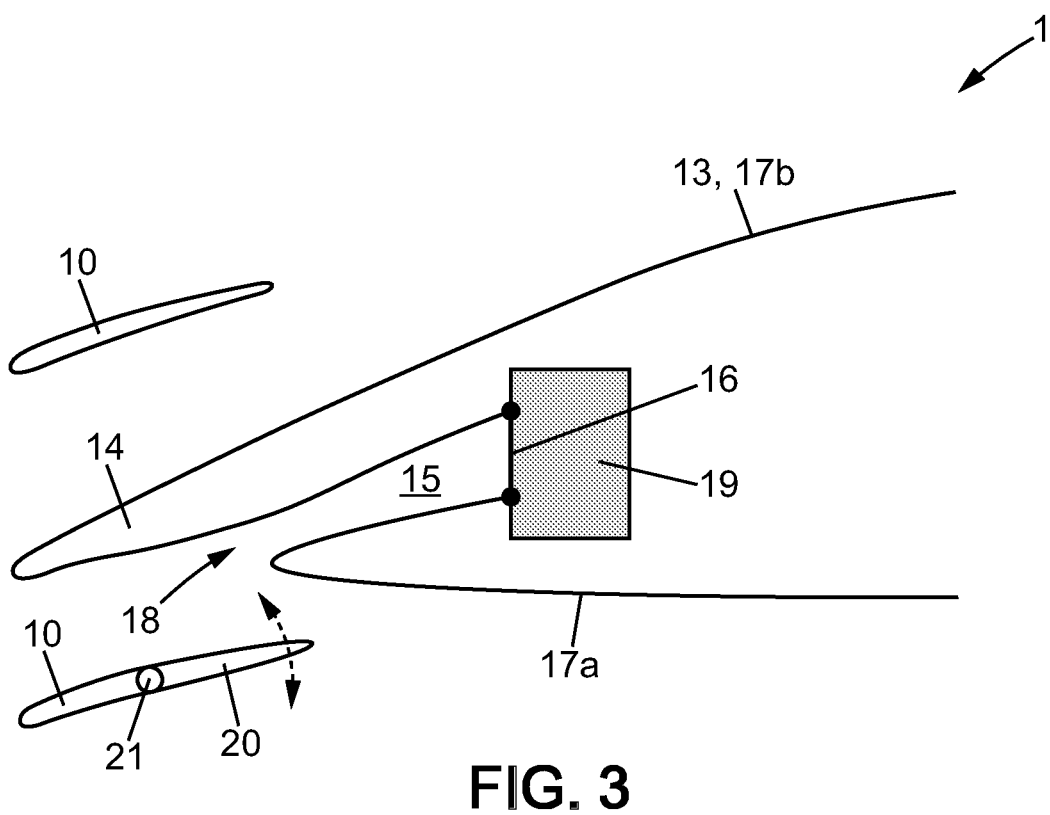
FIG. 3 is a view corresponding to FIG. 2, illustrating another position or geometry of the variable-geometry guide vane.

FIGS. 2 and 3 illustrate a portion of a turbojet engine 1 according to a first embodiment of the invention.

Figure 1:
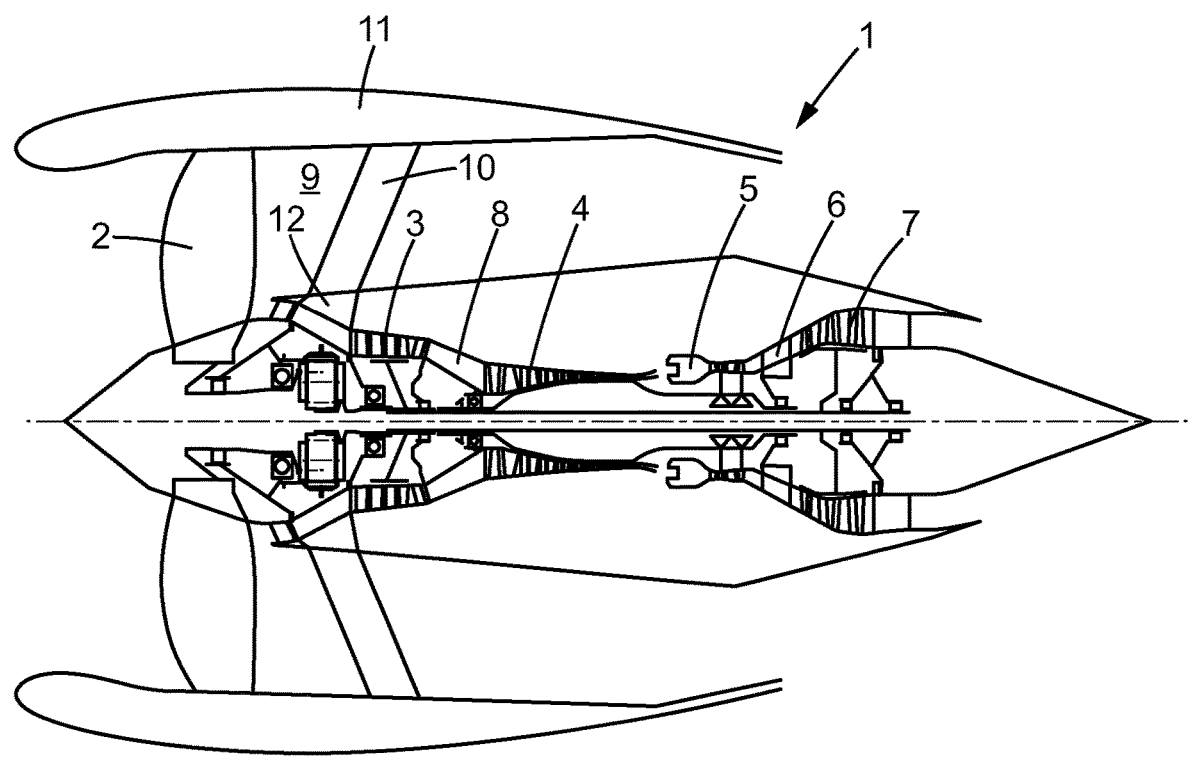
FIG. 1 is a partial longitudinal sectional view of a turbojet engine of the prior art.

The latter differs from the conventional turbojet illustrated in FIG. 1 by the elements described hereinafter.

Like before, the turbojet engine 1 includes an annular primary duct 8 of axis X and a secondary annular duct 9 surrounding the primary stream 8, a row of guide vanes 10 extending in the secondary duct 9, downstream of the fan 2. At least one conduit extends in the secondary duct downstream of the guide vanes 10 and is housed in a profiled casing 13 whose upstream portion 14 forms one of the guide vanes 10.

The casing 13 includes at least one air sampling scoop 15 equipped with a regulation valve 16. The scoop is of the flush type and opens out at an intrados surface 17a of the casing 13, at one opening 18, said opening 18 being located, at least partially, axially opposite the guide vanes 10. The scoop supplies air to a device 19, which may be a device of the aircraft (cooling of the air intended to get into the cabin, cooling of the air derived from the high-pressure compressor and intended to the aircraft, . . . ), or a device of the turbojet engine (device for cooling and managing the clearances of the low-pressure turbine, . . . ).

At least one of the guide vanes 10 located on the side of the extrados surface 17a of the casing 13 and located proximate to the casing 13 has a variable geometry and its geometry can be adjusted.

In particular, said guide vane 10 includes a downstream zone 20 able to pivot about a pivot 21, the pivot angle can be adjusted using an actuator, according to a pitch law taking into account for example the operating conditions. In particular, the pitch law may take into account the degree of opening of the valve 16 equipping the scoop 15 or the flow rate of air crossing the scoop 15.

For example, the actuator is a motor or a cylinder.

Such a structure allows modifying the shape, or the camber, of the considered guide vane 10 and, thus, regulating the flow rate and controlling the nature of the flow at the scoop 15. Thus, FIGS. 2 and 3 represent two different positions of the pivotable zone of the considered guide vane 10.

For example, FIG. 2 illustrates the case where the valve 16 equipping the scoop 15 is closed whereas FIG. 3 illustrates the case where this valve 16 is open.

Figure 4:
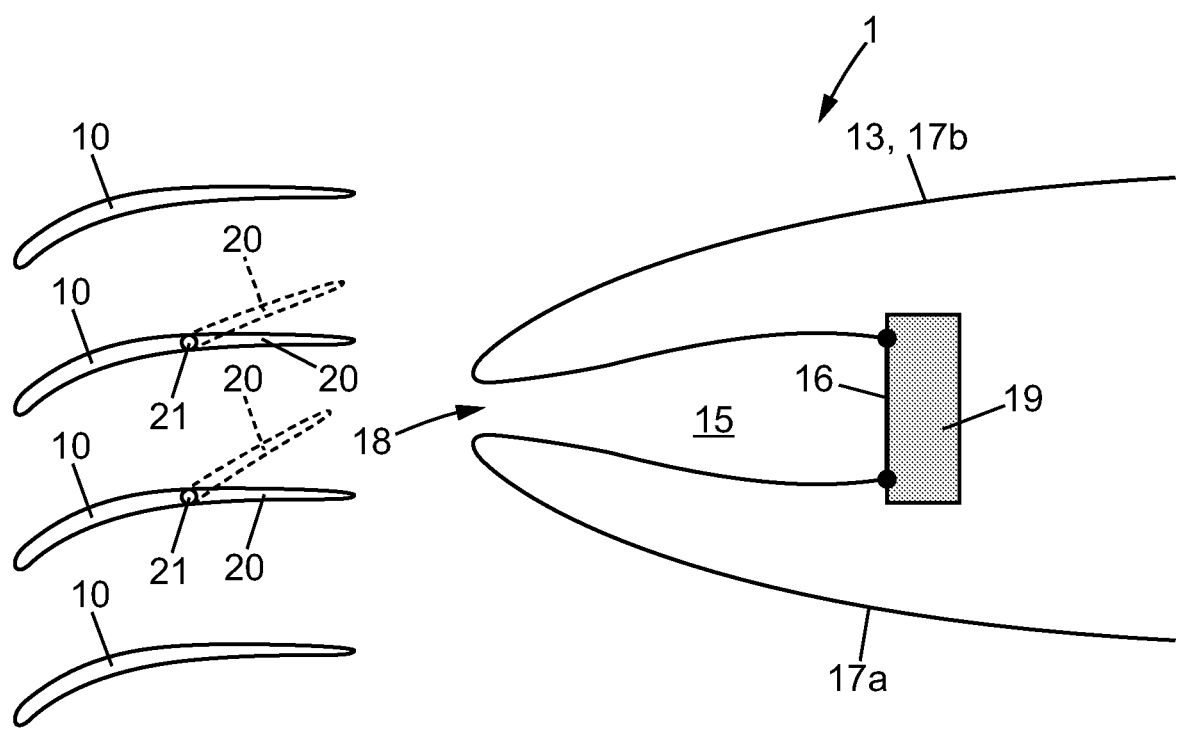
FIG. 4 is a schematic view of a portion of the secondary duct of a turbojet engine according to a second embodiment of the invention.

FIG. 4 illustrates another embodiment of the invention wherein the casing 13 is distinct from the guide vanes 10 and is located downstream of said vanes 10. The scoop 15 opens at its opening 18 located at the upstream end, also called the leading edge, of the casing 13.

In such a case, some of the guide vanes 10, herein the two vanes the closest to the opening, have a variable geometry, their geometry can be adjusted using one or more actuators.

Like before, each of these guide vanes 10 includes a downstream zone 20 able to pivot about a pivot 21, the pivot angle can be adjusted using an actuator, according to a pitch law taking into account for example the operating conditions. In particular, the pitch law may take into account the degree of opening of the valve 16 equipping the scoop 15 or the flow rate of air crossing the scoop 15.

For example, the position illustrated in solid lines illustrates the case where the valve 16 equipping the scoop 15 is open whereas the position illustrated in dotted lines illustrates the case where the valve 16 is closed.

The invention claimed is:

1. A turbojet engine, comprising:
   a primary duct and a secondary duct surrounding the primary duct;
   a row of guide vanes extending in the secondary duct downstream of a fan;
   a profiled casing extending in the secondary duct downstream of the row of guide vanes, the profiled casing configured to house at least one conduit; and
   at least one air sampling scoop located at the profiled casing and equipped with a regulation valve,
   wherein at least one guide vane located proximate to the profiled casing includes a variable-geometry zone, a geometry of which can be adjusted during operation, and
   wherein the at least one guide vane includes at least one pivotable zone around a pivot, a pivot angle of which can be controlled according to a pitch law taking into account a degree of opening of the regulation valve equipping the at least one air sampling scoop or a flow rate of air crossing the at least one air sampling scoop.

2. The turbojet engine of claim 1, wherein the profiled casing includes an upstream portion forming, at least partially, one of the guide vanes.

3. The turbojet engine of claim 1, wherein the at least one air sampling scoop opens out at a surface of the profiled casing at one opening, wherein the one opening is located, at least partially, axially opposite the row of guide vanes.

4. The turbojet engine of claim 1, wherein the at least one air sampling scoop opens out at a surface of the profiled casing at one opening, wherein the one opening is located axially downstream of the row of guide vanes.

5. The turbojet engine of claim 1, wherein the at least one air sampling scoop opens out at an upstream end of the profiled casing.

6. The turbojet engine of claim 1, wherein the at least one air sampling scoop opens out at an intrados surface or at an extrados surface of the profiled casing.

7. The turbojet engine of claim 1, wherein the at least one guide vane is located at a distance from the profiled casing.

8. An aircraft including a turbojet engine according to claim 1.

9. The turbojet engine of claim 1, wherein the at least one pivotable zone of the at least one guide vane is a downstream zone of the at least one guide vane.

* * * * *